United States Patent [19]
Shoyama

[11] Patent Number: 5,476,129
[45] Date of Patent: Dec. 19, 1995

[54] RADIAL TIRE FOR AIRCRAFT WITH SPECIFIED BEAD PORTIONS

[75] Inventor: Yoshinobu Shoyama, Tokyo, Japan

[73] Assignee: Bridgestone Corporation, Tokyo, Japan

[21] Appl. No.: 346,271

[22] Filed: Nov. 22, 1994

[30] Foreign Application Priority Data

Dec. 21, 1993 [JP] Japan ..................................... 5-322849

[51] Int. Cl.⁶ .............................. B60C 3/00; B60C 13/00; B60C 15/00; B60C 15/06
[52] U.S. Cl. ......................... 152/454; 152/525; 152/539; 152/541; 152/543; 152/547; 152/552; 152/553; 152/554
[58] Field of Search ..................... 152/454, 525, 152/539, 541, 543, 547, 552-554

[56] References Cited

U.S. PATENT DOCUMENTS 5,160,384  11/1992  Ueyoko et al. ..................... 152/547 X

FOREIGN PATENT DOCUMENTS 4169307  6/1992  Japan ..................................... 152/539
592709  4/1993  Japan .

OTHER PUBLICATIONS

Patent Abstracts of Japan, No. 61 (M-1460) corresponding to Japanese Laid-Open Patent Application No. Hei. 5-92709, Apr. 16, 1993, Kamiyoko et al.

Primary Examiner—Adrienne C. Johnstone
Attorney, Agent, or Firm—Sughrue, Mion, Zinn, Macpeak & Seas

[57] ABSTRACT

A radial tire for aircraft, which aims to prevent damage at the bead portion thereof, wherein the modulus MS of sidewall rubber at 100% elongation, modulus MS2 of 2nd stiffener rubber at 100% elongation, modulus MC of rubber chafer rubber at 100% elongation and modulus MS1 of 1st stiffener rubber at 100% elongation have the relationship of MS<MS2<MC<MS1; and a point C is located between a point A and a point B, where the points A and B are tire surface points which depart from rim flange when the tire is mounted on a normal rim and inflated at normal inflation pressure and loaded with 100% weight and 200% weight respectively of normal load, and the point C is the foot of a perpendicular to the tire surface from the radially outermost point of the 1st stiffener.

4 Claims, 2 Drawing Sheets

5,476,129

RADIAL TIRE FOR AIRCRAFT WITH SPECIFIED BEAD PORTIONS

BACKGROUND OF THE INVENTION

1. Field of the Invention

The present invention relates to a pneumatic radial tire for aircraft such as passenger jet airplanes.

2. Description of the Prior Art

Various kinds of radial tires exclusive for aircraft are used for aircraft such as passenger jet airplanes. In some of these tires, the same rubber is used for the sidewall rubber and rubber chafer. If the same rubber as used for the sidewall is used for the rubber chafer, since the rubber is soft, there is a possibility that air cells may occur in the rubber and the rubber chafer may blow-out under tire service conditions of high heat generation. Also, the rubber chafer may be worn out by chafing with the wheel rim after long distance tire service. On the other hand, if the same rubber as used for the chafer is used for the sidewall, there is the possibility that so-called ozone cracks may occur at the sidewall.

Since there occurs considerable load concentration at bead portions when large weight is loaded on a radial tire having flexible sidewalls, the modulus of 2nd stiffener rubber (2nd stiffeners provided at the bead portions and extending along the axially outer surface of the carcass) at 100% elongation is sometimes made larger than the modulus of the chafer rubber at 100% elongation so as to increase bending (flexural) rigidity of the bead portions. In this case, since the 2nd stiffener rubber is too rigid, there is the possibility that the 2nd stiffener may blow-out under tire service conditions of high heat generation. Also, the 2nd stiffener may be separated after long distance tire service.

An object of the present invention is to provide a pneumatic tire for aircraft which prevents or at least reduces such damage as rim chafing, blow-out and separation.

SUMMARY OF THE INVENTION

The present invention provides a pneumatic radial tire for aircraft, comprising:

a carcass composed of a main portion extending from a tread portion through sidewall portions to bead cores of bead portions and turn-up portions turned up around the bead cores, a part of the carcass being turned up from the inside to the outside of the tire and terminated in the vicinity of the bead cores, another part of the carcass being turned up from the inside to the outside of the tire and extended to the sidewall portions, and the remainder of the carcass being turned up around bead cores from the outside to the inside of the tire and terminated in the vicinity of the bead cores so as to cover the outer surface of the carcass turned up from the inside to the outside;

a tread portion for contacting a road surface provided at the crown portion of the carcass;

belt layers provided at the radially outside of the carcass and at the inside of the tread;

1st stiffeners extending radially outwardly of the bead cores and between the main portion of the carcass and the turn-up portions of the carcass;

2nd stiffeners provided at the bead portions and extending along the axially outer surface of the carcass;

sidewall rubbers comprising the sidewall portions; and rubber chafers comprising the tire outer surface from the sidewall portions to the bead base and including a portion to contact the rim flange when the tire is mounted on a normal rim and inflated at normal inflation pressure and loaded with 200% weight, of normal load; characterized in that:

(a) the modulus MS of the sidewall rubber at 100% elongation, the modulus MS2 of the 2nd stiffener rubber at 100% elongation, the modulus MC of the rubber chafer rubber at 100% elongation and the modulus MS1 of the 1st stiffener rubber at 100% elongation satisfy the relation MS<MS2<MC<MS1; and (b) a point C is located between a point A and a point B where, under the condition that the tire is mounted on a normal rim and inflated at normal inflation pressure, the point A is a tire surface point which departs from the rim flange when the tire is loaded with 100% weight of normal load, the point B is a tire surface point which departs from the rim flange when the tire is loaded with 200% weight of normal load, and the point C is the foot of a perpendicular to the tire surface from the radially outermost point of the 1st stiffener.

Preferred features of the invention are as follows:

(a) CL aside the bead core is from 20% to 50% of BL, where CL is the rubber thickness between the tire surface and the outermost ply and BL is the diameter of the bead core (in the direction of tire rotation).

(b) ML is located between the point A and the point B and ML is from 35% to 65% of BL, where ML is the maximum value of CL in the zone between aside the bead core and the maximum width of the sidewall.

(c) Between the point A and the point B, the rubber thickness GL of the rubber chafer is not less than 2.0 mm and less than 50% of CL.

In accordance with the present invention, since different kinds of rubbers are used for the sidewall and the rubber chafer, it is possible to select such sidewall rubber and the chafer rubber as is suited to each function. Namely, since the modulus of sidewall rubber at 100% elongation is selected to be lower than the modulus of chafer rubber at 100% elongation, heat generation by chafing the rubber chafer with the rim flange is reduced and consequently blow-out of the rubber chafer is restrained. Also, since strain of the rubber chafer chafing with the rim flange is reduced, the chafing amount of the rubber chafer is reduced. Also, since the sidewall deforms by small strain under the condition of large deformation of the sidewall portion, generation of ozone cracks (at the surface of sidewall rubber) is restrained.

In general, when the radial tire for aircraft is loaded, constant deformation occurs at the bead portion of the tire, namely the bead portion becomes under what is called constant strain conditions. Since the modulus of the 2nd stiffener rubber at 100% elongation is less than the modulus of chafer rubber at 100% elongation, stress of the 2nd stiffener is reduced, heat generation at the 2nd stiffener is reduced and blow-out of the 2nd stiffener is restrained.

If the location of the radially outermost edge of the 1st stiffener, namely the height of the 1st stiffener, is higher than the point B of a tire surface which departs from the rim flange when the tire is mounted on a normal rim and inflated at normal inflation pressure and loaded with 200% weight of normal load, the strain of the radially outermost edge of the 1st stiffener at tire loading becomes large and consequently heat generation is increased. If the location of the radially outermost edge of the 1st stiffener is lower than the point A of a tire surface point which departs from the rim flange when the tire is mounted on a normal rim and inflated at normal inflation pressure and loaded with 100% weight of normal load, since the distance between the main portion of the carcass and the turn-up portion of the carcass becomes narrow, shearing strain between both carcass portions increases. Therefore, in accordance with the invention, the point C of the foot of the perpendicular to the tire surface from the radially outermost point of the 1st stiffener is located between the point A and the point B.

As previously mentioned, CL aside the bead core is preferably from 20% to 50% of BL, where CL is the rubber thickness between the tire surface and the outermost ply and BL is the diameter of the bead core in the direction of tire rotation. If CL is less than 20% of BL, since the contact pressure of the tire surface newly contacting with the rim flange under load conditions is increased, the amount of rubber chafer chafing is increased. If CL is greater than 50% of BL, the effect of reducing the contact pressure is not improved further and the tire weight is increased due to increase of the rubber thickness.

Also as previously mentioned, ML is located between the point A and the point B and ML is preferably from 35% to 65% of BL, where ML is the maximum value of CL in the zone between aside the bead core and the maximum width of the sidewall. In order to satisfy the required bead endurance under high load conditions up to 200% of normal load, since deformation of the rubber between the point A and the point B is the largest, the rubber thickness CL between the tire surface and the outermost ply is arranged to be maximum between the point A and the point B so as to relax strain at the area.

If ML is less than 35% of BL, since strain at high load becomes large, separation damage occurs inside the 2nd stiffener. If ML is greater than 65% of BL, since heat is accumulated inside and rubber is deteriorated, separation damage occurs inside the 2nd stiffener.

As further previously mentioned, between the point A and the point B, the rubber thickness GL of the rubber chafer is preferably not less than 2.0 mm and is less than 50% of CL. If CL is less than 2.0 ram, since strain of the rubber chafer chafing with the rim, namely surface shearing strain at the point of road contact-in and at the point of road contact-out during tire rotation becomes large, chafing of the rubber chafer easily occurs. If GL is greater than 50% of CL, the tire tends to blow out due to heat build-up inside the rubber chafer.

DESCRIPTION OF THE PREFERRED EMBODIMENTS

Figure 1:
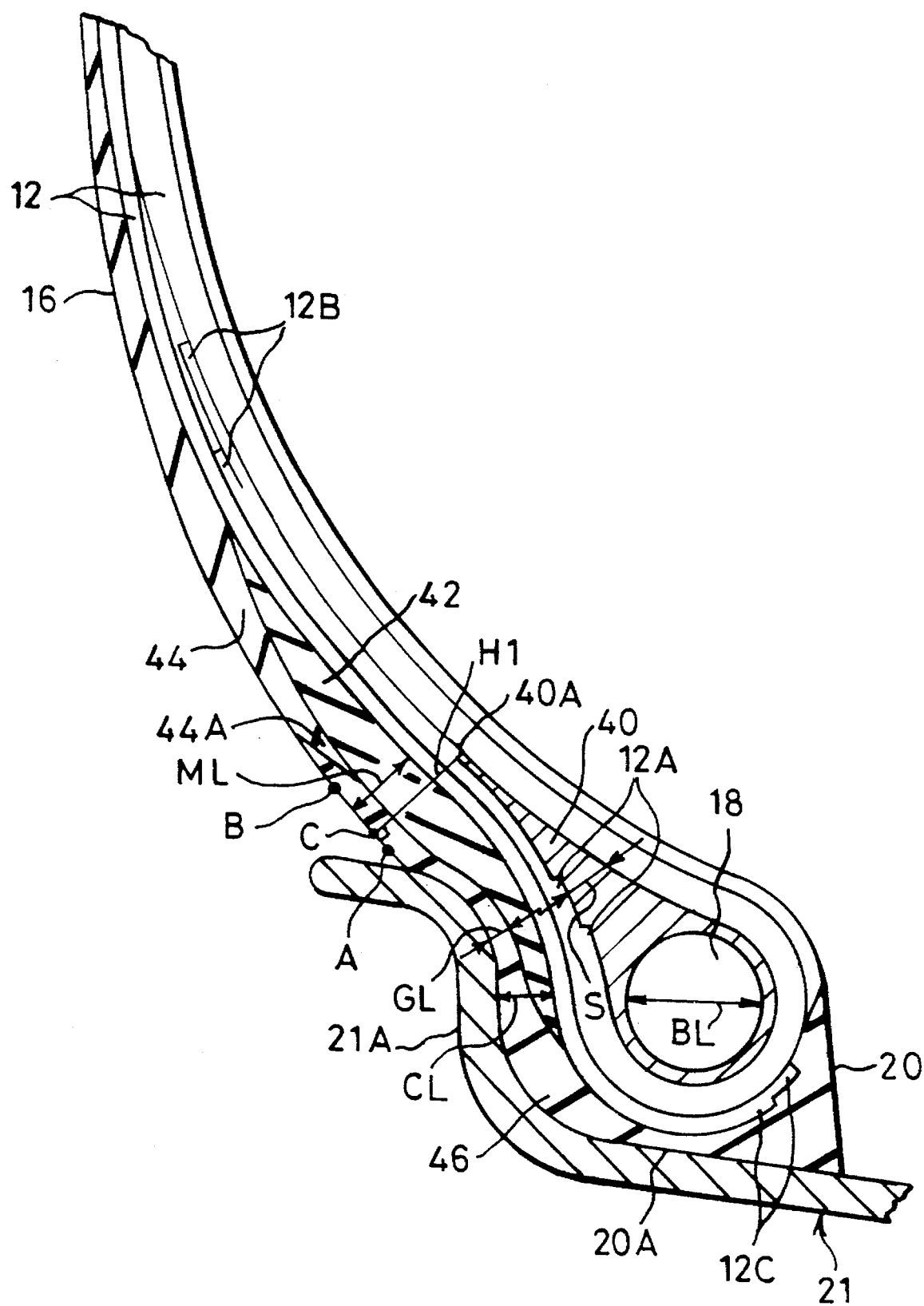
FIG. 1 is a cross-section view showing the vicinity of the bead portion of an embodiment of a tire in accordance with the invention.
Figure 2:
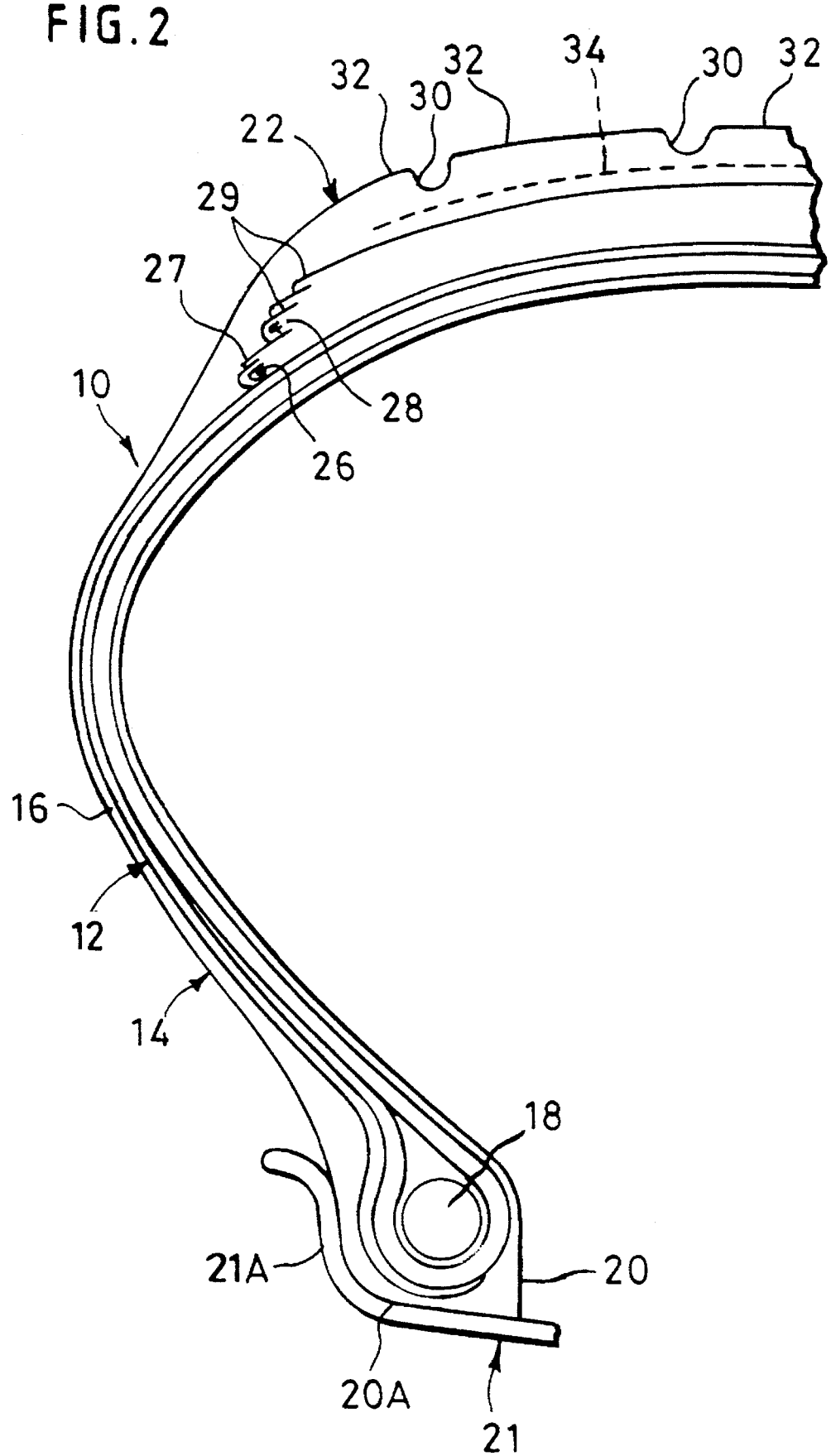
FIG. 2 is a cross-section view, omitting hatching, showing the tire in accordance with the invention.

FIGS. 1 and 2 show an embodiment of a radial tire for aircraft in accordance with the invention. The tire 10 is a pressure vessel in which internal air pressure is maintained by the carcass 12. The carcass has a toroidal cross-section and is composed of a plurality of rubberized fiber (e.g. nylon, polyester or aramid) cords or steel cords. The tire 10 has a radial construction in which the axial direction of the carcass cords extends along the direction of tire width (at the crown).

The surface of the carcass 12 is covered by a rubber layer 14. The rubber layer 14 has a function to protect the outside of the carcass 12 at the sidewall portion 16. Both edges of the carcass 12 are turned up around and retained at bead cores 18 which are formed to be circular with respect to the tire rotation axis. Each bead core 18 is covered by the rubber layer 14 and is a component of the bead portion 20. The bead portion 20 defines the internal dimension of the tire and secures engagement with a rim 21.

The carcass 12 is composed of a main portion extending from the tread portion through the sidewalls 16 to the bead cores 18 of the bead portions 20 and turn-up portions turned up around the bead cores 18. As shown in FIG. 1, a part 12A of the carcass 12 is turned up around the bead core 18 from the inside to the outside of the tire and terminates in the vicinity of the bead core 18, and another part 12B of the carcass is turned up around the bead core 18 from the inside to the outside of the tire and extended to the sidewall 16, and the remainder 12C of the carcass 12 is turned up around the bead core 18 from the outside to the inside of the tire and terminated adjacent the bead core 18 so as to cover the outer surface of the part 12A and the part 12B of the carcass.

A 1st stiffener 40 extends radially outwardly at the radially outside of the bead core 18 and between the main portion of the carcass 12 and the turn-up portion of the carcass. The modulus MS1 of the 1st stiffener rubber at 100% elongation is 50 to 150Kg/cm². A 2nd stiffener 42 is provided at the bead portion and extends along the axially outer surface of the carcass 12. The modulus MS2 of the 2nd stiffener rubber at 100% elongation is 20 to 50 Kg/cm².

The modulus MS of the sidewall rubber 44 at 100% elongation is 10 to 40 Kg/cm².

The edge 44A of the sidewall rubber 44 at the bead portion side is covered by a rubber chafer 46. The rubber chafer 46 comprises the tire outer surface from the base 20A of the bead portion 20 to the sidewall portion 16 extending radially outwardly and comprises a portion to contact the rim flange 21A when the tire 10 is mounted on a normal rim 21 and inflated at normal inflation pressure and loaded with 200% weight of normal load. The modulus MC of the chafer rubber at 100% elongation is 25 to 60 Kg/cm².

The modulus MS of the sidewall rubber at 100% elongation, the modulus MS2 of the 2nd stiffener rubber at 100% elongation, the modulus MC of the rubber chafer rubber at 100% elongation and the modulus MS1 of the 1st stiffener rubber at 100% elongation have the relationship of MS<MS2<MC<MS1.

A point C is located between a point A and a point B where, under the condition that the tire 10 is mounted on a normal rim 21 and inflated at normal inflation pressure, the point A is a tire surface point which departs from the rim flange 21A when the tire 10 is loaded with 100% weight of normal load, the point B is a tire surface point which departs from the rim flange 21A when the tire 10 is loaded with 200% weight of normal load, and the point C is the foot of a perpendicular H1 to the tire surface from the radially outermost point 40A of the 1st stiffener 40.

CL aside the bead core 18 is preferably from 20% to 50% of BL, where CL is the rubber thickness between the tire surface and the outermost carcass ply and BL is the diameter of the bead core 18 in the direction of tire rotation.

ML is located between the point A and the point B and ML is preferably from 35% to 65% of BL, where ML is the maximum value of CL in the zone between aside the bead core 18 and the maximum width of the sidewall 16.

Between the point A and the point B, the rubber thickness GL of the rubber chafer 46 is preferably not less than 2.0 mm and is less than 50% of CL.

As shown in FIG. 2, the upper portion of the rubber layer 14 continues to the tread portion 22. Since the tread portion 22 actually contacts the road surface, it has sufficient thickness to endure wear and external damage.

Folded belt layers 26, a non-folded belt layer 27 having circumferentially extending cords, folded belt layers 28 and non-folded belt layers 29, all of which are made of rubberized cord layer(s), are laminated and disposed between the carcass 12 and the tread portion 22, and the rigidity of the tire 10 is maintained by these belt layers 26, 27, 28 and 29. Several circumferentially extending grooves 30 are disposed in the tread portion 22, and several circumferentially extending ribs 32 are formed by these grooves 30. These grooves 30 have the function of water drainage, ornamental design and heat radiation from the tire 10.

In the tread portion 22, a protective layer 34 is disposed apart from and at the outside of the outermost belt 29. The protective layer 34 is a rubberized canvas made of for example aramid cords and has a function to protect the belt 29 so that cut damage on the surface of the tread portion 22 does not progress and reach the belt 29. The width of the protective layer 34 is preferably the same as or slightly narrower than the tread width.

Since different rubbers are used for the sidewall 44 and the rubber chafer 46, it is possible to select such sidewall rubber and chafer rubber as is suited to each function. Namely, since the modulus of the sidewall rubber at 100% elongation is selected to be less than the modulus of the chafer rubber at 100% elongation, heat generation by chafing the rubber chafer 46 with the rim flange 21A is reduced and consequently blow-out of the rubber chafer is restrained. Also, since strain of the rubber chafer 46 chafing with the rim flange 21A is reduced, the chafing amount of the rubber chafer is reduced.

Also, since the sidewall 44 deforms by small strain under the condition of large deformation of the sidewall portion 16, generation of ozone cracks at the sidewall is restrained.

In general, when the radial tire for aircraft is loaded, constant deformation occurs at the bead portion of the tire, namely the bead portion becomes under what is called constant strain conditions. Since the modulus MS2 of the 2nd stiffener rubber at 100% elongation is lower than the modulus MC of the chafer rubber at 100% elongation, stress of the 2nd stiffener 42 is reduced, heat generation at the 2nd stiffener is reduced, and blow-out of the 2nd stiffener is restrained.

If the location of the radially outermost edge 40A of the st stiffener 40, namely the height of the 1st stiffener, is higher than the tire surface point B which departs from the rim flange 21A when the tire is mounted on a normal rim and inflated at normal inflation pressure and loaded with 200% weight of normal load, the strain of the radially outermost edge 40A of the 1st stiffener 40 at tire loading becomes large and consequently heat generation is increased. If the location of the radially outermost edge 40A of the 1st stiffener 40 is lower than the tire surface point A which departs from the rim flange when the tire is mounted on a normal rim and inflated at normal inflation pressure and loaded with 100% weight of normal load, since the distance S between the main portion of the carcass and the turn-up portion of the carcass becomes narrow, shearing strain between both carcass portions increases. Therefore, in accordance with the invention, the point C of the foot of the perpendicular H1 to the tire surface from the radially outermost point 40A of the 1st stiffener 40 is located between the point A and the point B.

In accordance with the invention, CL aside the bead core 18 is preferably from 20% to 50% of BL, where CL is the rubber thickness between the tire surface and the outermost ply and BL is the diameter of the bead core 18 in the direction of tire rotation. If CL aside the bead core 18 is less than 20% of BL, since the contact pressure of the tire surface newly contacting with the rim flange 21A under load conditions is increased, the amount of rubber chafer chafing is increased. If CL aside the bead core is greater than 50% of BL, the effect of reducing the contact pressure is not improved further and the tire weight is increased due to increase of the rubber thickness.

In accordance with the invention, ML is located between the point A and the point B and ML is preferably from 35% to 65% of BL, where ML is the maximum value of CL in the zone between aside the bead core 18 and the maximum width of the sidewall portion 16. In order to satisfy the required bead endurance under high load conditions up to 200% of normal load, since deformation of the rubber between the point A and the point B is the largest, the rubber thickness CL between the tire surface and the outermost ply is arranged to be maximum between the point A and the point B so as to relax strain at the area.

If ML is less than 35% of BL, since strain at high load becomes large, separation damage occurs inside the 2nd stiffener 42. If ML is greater than 65% of BL, since heat is accumulated inside and rubber is deteriorated, separation damage occurs inside the 2nd stiffener 42.

In accordance with the invention, between the point A and the point B, the rubber thickness GL of the rubber chafer 46 is preferably not less than 2.0 mm and is less than 50% of CL. If GL is less than 2.0 ram, since chafing strain of the rubber chafer 46 with the rim flange 21A, namely surface shearing strain (creasy deformation on the rubber surface) at the point of road contact-in and at the point of road contact-out during tire rotation becomes large, chafing of the rubber chafer easily occurs. If GL is greater than 50% of CL, the tire tends to blow out due to heat build-up inside the rubber chafer 46.

Radial tires for aircraft comprising the tire of the invention as shown in FIGS. 1 and 2 (referred to as example tire) and comparison tires 1 to 4 as shown in Table 1 were manufactured for trial and tested under test conditions as shown in Table 2. The test results are shown in Table 3.

TABLE 1

|  | Example | Comp.-1 | Comp.-2 | Comp.-3 | Comp.-4 |
| --- | --- | --- | --- | --- | --- |
| Ms | 16Kg/cm$^2$ | 30Kg/cm$^2$ | 16Kg/cm$^2$ | 16Kg/cm$^2$ | 36Kg/cm$^2$ |
| MS2 | 31Kg/cm$^2$ | 63Kg/cm$^2$ | 40Kg/cm$^2$ | 31Kg/cm$^2$ | 31Kg/cm$^2$ |
| MC | 36Kg/cm$^2$ | 30Kg/cm$^2$ | 30Kg/cm$^2$ | 16Kg/cm$^2$ | 36Kg/cm$^2$ |
| MS1 | 92Kg/cm$^2$ | 116Kg/cm$^2$ | 92Kg/cm$^2$ | 92Kg/cm$^2$ | 92Kg/cm$^2$ |

TABLE 1-continued

|  | Example | Comp.-1 | Comp.-2 | Comp.-3 | Comp.-4 |
| --- | --- | --- | --- | --- | --- |
| CL/BL | 35% | 25% | 35% | 35% | 35% |
| ML/BL | 49% | 32% | 49% | 49% | 49% |
| GL/CL | 32% | 50% | 32% | 32% | 32% |
| location of 40A | A < 40A < B | B < 40A | A < 40A < B | A < 40A < B | A < 40A < B |
|  | (note 1) | (note 2) | (note 1) | (note 1) | (note 1) |

Note 1:
"A < 40A < B" means the outermost edge 40A of the 1st stiffener is located between the point A and the point B.
Note 2:
"B < 40A" means the outermost edge 40A of the 1st stiffener is located higher than the point B.
Tire Size
46 × 17R20.
Carcass Construction
The inner 4 plies are turned up around the bead core from the inside to the outside of the tire. The outer 2 plies are turned up around the bead core from the outside to the inside of the tire.
Belt Construction
Number of belt layers is 11, some of which are folded belt layers and the other are non-folded belt layers having circumferentially extending cords.
Bead Construction
Cable bead having 22.6 mm diameter.
Protective Layer
A canvas layer.
GL
mm or more.

TABLE 2

|  |  |
| --- | --- |
| | normal inflation pressure: 15.6Kg/cm². normal load: 20870Kg/tire (both defined by TRA of tire standard in USA) |
| Test 1 | take off drum test at 150% load of the normal load and at 225 mph under the condition of universal running mode |
| Test 2 | 800 times repeated drum test of 8 minutes running per hour at 80% load of the normal load, namely 16700Kg and at 40 mph. |
| Test 3 | leave the tire alone outdoors after mounting on a rim and inflating at the normal inflation pressure |

TABLE 3

|  | Test 1 | Test 2 | Test 3 |
| --- | --- | --- | --- |
| Example | no damage | no damage | no ozone cracks at the sidewall rubber |
| Comp.-1 | damage (A) | damage (A) | no ozone cracks at the sidewall rubber |
| Comp.-2 | damage (A) | damage (A) | no ozone cracks at the sidewall rubber |
| Comp.-3 | damage (B) | damage (B) | no ozone cracks at the sidewall rubber |
| Comp.-4 | no damage | no damage | ozone cracks occurred at the sidewall rubber |

From the above Table 3, it is clear that the tire in accordance with the invention (example tire) is the least likely to suffer from bead damage.

Since the tire in accordance with the invention has the above-mentioned structure, it has a superior effect of preventing damage at the bead portion.

While the invention has been particularly shown and described with reference to certain preferred embodiments thereof, it will be understood by those skilled in the art that various changes and modifications may be made without departing from the spirit and scope of the invention.

I claim:

1. A pneumatic radial tire for aircraft, comprising:

a carcass composed of a main portion extending from a tread portion through sidewall portions to bead cores of bead portions and turn-up portions turned up around the bead cores, a part of the carcass being turned up from the inside to the outside of the tire and terminated in the vicinity of the bead cores, another part of the carcass being turned up from the inside to the outside of the tire and extended to the sidewall portions, and the remainder of the carcass being turned up around the bead cores from the outside to the inside of the tire and terminated in the vicinity of the bead cores so as to cover the outer surface of the carcass turned up from the inside to the outside;

a tread portion for contacting a road surface provided at the crown portion of the carcass;

belt layers provided at the radially outside of the carcass and at the inside of the tread;

1st stiffeners extending radially outwardly of the bead cores and between the main portion of the carcass and the turn-up portions of the carcass;

2nd stiffeners provided at the bead portions and extending along the axially outer surface of the carcass;

sidewall rubbers comprising the sidewall portions; and rubber chafers comprising the tire outer surface from the sidewall portions to the bead base and including a portion to contact the rim flange when the tire is mounted on a normal rim and inflated at normal inflation pressure and loaded with 200% weight of normal load; wherein:

(a) the modulus MS of the sidewall rubber at 100% elongation, the modulus MS2 of the 2nd stiffener rubber at 100% elongation, the modulus MC of the rubber chafer rubber at 100% elongation and the modulus MS1 of the 1st stiffener rubber at 100% elongation satisfy the relation MS<MS2<MC<MS1; and b) a point C is located between a point A and a point B where, under the condition that the tire is mounted on a normal rim and inflated at normal inflation pressure, the point A is a tire surface point which departs from the rim flange when the tire is loaded with 100% weight of normal load, the point B is a tire surface point which departs from the rim flange when the tire is loaded with 200% weight of normal load, and the point C is the foot of a perpendicular to the tire surface from the radially outermost point of the 1st stiffener.

2. The pneumatic tire according to claim 1, wherein CL aside the bead core is from 20% to 50% of BL, where CL is the rubber thickness between the tire surface and the outermost carcass ply and BL is the diameter of the bead core.

3. The pneumatic tire according to claim 1, wherein ML is located between the point A and the point B and ML is from 35% to 65% of BL, where ML is the maximum value of CL in the zone between aside the bead core and the maximum width of the sidewall, where BL is the diameter of the bead core and CL is the rubber thickness between the tire surface and the outermost carcass ply.

4. The pneumatic tire according to claim 1, wherein, between the point A and the point B, the rubber thickness GL of the rubber chafer is not less than 2.0 mm and is less than 50% of CL, where CL is the rubber thickness between the tire surface and the outermost carcass ply.

* * * * *